(12) United States Patent
Wunderlich

(10) Patent No.: US 10,311,834 B2
(45) Date of Patent: Jun. 4, 2019

(54) DEVICE FOR ARRANGING IN A MOTOR VEHICLE, MOTOR VEHICLE HAVING A DEVICE, AND METHOD FOR OPERATING A DEVICE

(71) Applicant: AUDI AG, Ingolstadt (DE)

(72) Inventor: Matthias Wunderlich, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/570,944

(22) PCT Filed: Nov. 2, 2016

(86) PCT No.: PCT/EP2016/076418
§ 371 (c)(1),
(2) Date: Oct. 31, 2017

(87) PCT Pub. No.: WO2017/092952
PCT Pub. Date: Jun. 8, 2017

(65) Prior Publication Data
US 2018/0286358 A1    Oct. 4, 2018

(30) Foreign Application Priority Data
Dec. 3, 2015 (DE) .................. 10 2015 015 630

(51) Int. Cl.
*G06F 1/16* (2006.01)
*G09G 5/373* (2006.01)
(Continued)

(52) U.S. Cl.
CPC ............ *G09G 5/373* (2013.01); *B60K 35/00* (2013.01); *B60K 37/04* (2013.01);
(Continued)

(58) Field of Classification Search
CPC ...................................... B60K 35/00
See application file for complete search history.

(56) References Cited

U.S. PATENT DOCUMENTS 7,804,399 B2    9/2010   Okuno et al.
9,013,431 B2    4/2015   Choi et al.
(Continued)

FOREIGN PATENT DOCUMENTS

DE           101 15 050 A1   10/2002
DE    10 2009 043 038 A1     4/2010
(Continued)

OTHER PUBLICATIONS

English Translation of the International Preliminary Report on Patentability dated Jun. 14, 2018 from International Patent Application No. PCT/EP2016/076418, 7 pages.
(Continued)

*Primary Examiner* — Phi Hoang
(74) *Attorney, Agent, or Firm* — Staas & Halsey LLP

(57) ABSTRACT

A motor vehicle includes a display device designed for depicting objects, a computing device for controlling the display device, and a stowage unit in which a first end region of the display device is inserted. In a stowage position of the display device, the entire display device is inserted in the stowage unit, and, starting from the stowage position, a useful region of the display device is extendable out of the stowage unit by a predeterminable use distance. The display device is lockable at different length values of the use distance, and therefore a plurality of different use positions results, and the computing device is designed to adjust the depiction of the objects depending on the current length value of the use distance.

20 Claims, 4 Drawing Sheets

(51) Int. Cl.
*B60K 35/00* (2006.01)
*B60K 37/04* (2006.01)
*B60R 11/02* (2006.01)
*B60R 11/00* (2006.01)

(52) U.S. Cl.
CPC ........ *B60R 11/0235* (2013.01); *G06F 1/1652* (2013.01); *G06F 1/1677* (2013.01); *B60K 2350/352* (2013.01); *B60K 2350/405* (2013.01); *B60K 2350/925* (2013.01); *B60R 2011/0007* (2013.01); *B60R 2011/0043* (2013.01); *B60R 2011/0082* (2013.01); *B60R 2011/0084* (2013.01); *B60R 2011/0092* (2013.01); *B60R 2011/0094* (2013.01); *G09G 2380/02* (2013.01); *G09G 2380/10* (2013.01)

(56) References Cited

U.S. PATENT DOCUMENTS

| | | | |
|---|---|---|---|
| 2003/0162312 A1* | 8/2003 | Takayama | H01L 21/76251 438/22 |
| 2005/0280157 A1* | 12/2005 | Roush | H01L 23/4985 257/773 |
| 2007/0138822 A1* | 6/2007 | Feit | B60K 35/00 296/70 |
| 2014/0099479 A1 | 4/2014 | Krall et al. | |
| 2014/0380186 A1 | 12/2014 | Kim et al. | |
| 2016/0051067 A1* | 2/2016 | Law | F16M 11/041 361/679.22 |
| 2017/0108988 A1* | 4/2017 | Kim | G06F 3/0421 |

FOREIGN PATENT DOCUMENTS

| | | |
|---|---|---|
| DE | 10 2010 047 625 A1 | 4/2012 |
| DE | 10 2014 006 338 A1 | 11/2015 |
| DE | 10 2015 015 630.6 | 12/2015 |
| EP | 1 637 387 A1 | 3/2006 |
| GB | 2 503 337 A | 12/2013 |
| WO | PCT/EP2016/076418 | 11/2016 |

OTHER PUBLICATIONS

German Office Action dated Jul. 13, 2016 from German Patent Application No. 10 2015 015 630.6, 10 pages.
International Search Report dated Feb. 6, 2017 from International Patent Application No. PCT/EP2016/076418, 3 pages.
Chinese Office Action dated Feb. 3, 2019, from Chinese Patent Application No. 201680017125.2, with English language translation of summary of Examiner's comments (10 pages total).

* cited by examiner

DEVICE FOR ARRANGING IN A MOTOR VEHICLE, MOTOR VEHICLE HAVING A DEVICE, AND METHOD FOR OPERATING A DEVICE

CROSS REFERENCE TO RELATED APPLICATIONS

This application is a U.S. national stage of International Application No. PCT/EP2016/076418, filed on Nov. 2, 2016. The International Application claims the priority benefit of German Application No. 10 2015 015 630.6 filed on Dec. 3, 2015. Both applications are incorporated by reference herein in their entirety.

BACKGROUND

Described herein is a device for installation in a motor vehicle, with a display device which is designed for depicting objects, with a computing device for controlling the display device, and with a stowage unit, into which a first end region of the display device is inserted. In a stowage position of the display device, the entire display device is inserted in the stowage unit and, starting from the stowage position, a useful region of the display device is extendable out of the stowage unit by a predeterminable use distance. Further aspects of the disclosure relate to a motor vehicle having such a device, and to a method for operating such a device.

The use of such devices is widespread in the automobile sector, for example for depicting and processing information for vehicle occupants.

German Patent Application Publication 101 15 050 A1 describes a display device with a display, wherein the rear side of the display has a supporting structure in the form of a flexible frame. The display can be stored in a "parking state" between two sheet metal elements and can be protected by the same, wherein the sheet metal elements define a channel. The display here is flexible and can be extended out of the channel and brought into an unambiguously predetermined position by a self-coiling spool. In the unambiguously predetermined position, the display is held by a plurality of structural elements, lined up next to one another, of the frame.

European Patent Application Publication 1 637 387 A1 describes a display device for a vehicle, which includes what is referred to as electronic paper for depicting information. The electronic paper can be rolled up in a sleeve and is fixed by a slideable lattice grate, which is arranged on the rear side of the electronic paper, in such a manner that the electronic paper has a substantially flat surface.

A glove compartment with a screen is known from German Patent Application No. 10 2010 047 625 A1. The glove compartment is formed below a dashboard of a motor vehicle and includes a movable flap for opening and closing the glove compartment. A screen is integrated here in the movable flap and is extendable out of the flap.

SUMMARY

It is an aspect of the disclosure to provide a device and a motor vehicle of the type mentioned at the beginning, which have a particularly high degree of functionality, and to provide a method for operating such a device.

Described herein is a device for installation in a motor vehicle. The device may include a display device which is configured for depicting objects, a computing device for controlling the display device, and a stowage unit in which a first end region of the display device is inserted, wherein, in a stowage position of the display device, the entire display device is inserted in the stowage unit, and, starting from the stowage position, a useful region of the display device is extendable out of the stowage unit by a predeterminable use distance.

The objects can be, for example, icons or graphical elements, such as, for example, virtual oil level indicators or wear displays of service brakes of a motor vehicle, to mention just a few examples. The display device can be configured, for example, as a flexible display. The useful region of the display device can be, for example, a region of the display device, at which, in a position different from the stowage position, there is a free and unobstructed view of the display device for vehicle occupants.

According to the disclosure, it is provided that the display device is lockable at different length values of the use distance, and therefore a plurality of different use positions results, and the computing device is designed to adjust the depiction of the objects depending on the current length value of the use distance.

The display device is therefore lockable in a plurality of different use positions, wherein it is also possible only partially to extend the display device out of the stowage unit and therefore to release only part of a maximum useful region as useful region of the display device for looking at by the vehicle occupants. The maximum useful region could correspond here to that useful region in which the display device is maximally extended within the scope of its kinematic limits from the stowage unit. The various use positions can each be assigned differently sized depiction areas of the useful region. Accordingly, it is possible, for example, that, in a first use position, the display device is extended only up to 75% out of the stowage unit and accordingly a smaller useful region is available for depicting the objects than in the case of a maximally extended display device. Accordingly, the different length values of the useful distance can be assigned to the respectively different use positions. In other words, a respective length value of the use distance can in each case be assigned here to an associated use position. Depending on the size of the useful region and accordingly the associated length value of the use distance, the computing device adjusts the depiction of the objects as a function of the current length value of the use distance. This has the advantage that, in order to depict objects of this type which require only a small amount of space, the display device merely has to be partially extended out of the stowage unit, and therefore as one of the use positions, an intermediate position between a maximally extended use position and the stowage position can also be set. In the intermediate position, the device can be arranged particularly compactly in the motor vehicle and can conceal only a small region, and therefore, for example, in this intermediate position (as one of the use position), a view of regions of the motor vehicle located behind the device is blocked only in a small region. This permits a particularly efficient use of the construction space available in a motor vehicle.

In an advantageous refinement, the stowage unit may include a first stowage element, into which the first end region of the display device is inserted at least in regions, and a second stowage element, in which a second end region of the display device opposite the first end region is inserted, wherein the two stowage elements are movable apart in order to extend the useful region. The first end region can be arranged movably in the first stowage element and the second end region can be arranged movably in the second stowage element. The first end region here can be, for example, an upper end of the display device and therefore, for example, an upper edge region, and the second end region can be a lower end which is opposite thereto and accordingly is a lower edge region of the display device. The first end region and the second end region can each extend, for example, as far as the center of the display device and can therefore each take up half of the display device. In order to extend the useful region, the two stowage elements can be moved apart. Of course, it is alternatively also possible for only one of the stowage elements to be moved, whereas the other stowage element in each case is kept in position. By virtue of the possibility of moving both stowage elements, the stowage unit can be operated in a manner particularly matching requirements, as a result of which the functionality of the entire device is increased.

In a further advantageous refinement, the first end region and/or the second end region as the respective free end of the display device are/is accommodated in the respective stowage element. In other words, the first end region and, additionally or alternatively, the second end region as the respective free end of the display device can be accommodated in the respective stowage element and can be mounted movably there. By accommodating at least one of the end regions as the free end of the display device in the respective stowage element, any winding up devices, such as, for example, winding rollers, can be dispensed with. Weight can thereby be saved.

In a further advantageous refinement, the display device is of a flexible design and is inserted in a curved manner in the stowage unit in the stowage position. The display device here can be completely curved, i.e., in other words, on both end regions and on the useful region thereof, and, in the stowage position, can be inserted into the stowage unit. By the flexible configuration and complete curvability of the display device, which can be configured, for example, as an OLED or as electronic paper, the display device can be stored in a particularly small space in the stowage position and inserted into the stowage unit. The curvature of the display device makes it possible for a stowage space available in the stowage unit or spaces available in the individual stowage elements to be able to be used particularly efficiently. This permits a particularly compact and space-saving arrangement of the display device in the stowage position.

In a further advantageous refinement, the display device is lockable by a hooking-behind device or by a magnetic receptacle or by a touch and close fastener. By locking of the display device by a hooking-behind device, magnetic receptacle or a touch and close fastener, the display device is manually releasable particularly easily and is accordingly simply and reliably adjustable between the stowage position and the plurality of different use positions.

A further aspect of the disclosure relates to a motor vehicle with a device of this type, wherein the device is mounted on a holding unit of the motor vehicle. According to the disclosure, the device is mounted on the holding unit so as to be movable relative thereto. The holding unit can be designed, for example, as a central console of the motor vehicle. The entire device can be mounted on the holding unit so as to be movable relative to the holding unit and along the holding unit. As a result, the device cannot only be adjusted between the various use positions and the stowage position, but can be moved in its entirety relative to the holding unit and along the latter. The two stowage elements can also be moved here relative to the holding unit. As a result, operator control elements of the motor vehicle that are arranged behind the device are particularly easily accessible.

In a further advantageous embodiment, the first stowage element of the stowage unit and/or the second stowage element of the stowage unit are/is held releaseably on the holding unit, and the display device is configured flexibly in such a manner that the extended useful region is twistable without destruction when the stowage element is detached. The functionality of the device is increased to a particular extent as a result, particularly since the possibility of twisting the display device permits an inclination at least in regions or a pivoting of the display device in the direction of a certain vehicle occupant. For example, a first element end of one of the stowage elements can remain locked to the holding unit, whereas a second element end of the corresponding stowage element is detached from the holding unit and is pivoted about a locking point of the first element end, wherein the display device is twisted at least in regions as a result. It is thus possible for the display device to pivot and in the process to twist at least in regions in the direction of a certain vehicle occupant.

In a further advantageous refinement, in each of the use positions, the extended useful region of the display device is oriented along a contour of the holding unit, the contour facing the display device. Accordingly, for example, a useful region curvature of the useful region can be adapted to a contour curvature of the contour. The display device thereby requires particularly little space in each of the use positions.

A further aspect of the disclosure relates to a method for operating a device of this type. According to the disclosure, the computing device adjusts the depiction of the objects as a function of the current length value of the use distance. This permits a particularly simple operation of the device and at the same time a depiction of the objects that is particularly adequate for the situation, as a result of which particularly good identifiability of the objects by vehicle occupants is ensured at all times and automatically.

In a further advantageous refinement, the computing device adjusts a format of the depiction depending on the current length value of the use distance. During the adjustment of the format, for example, a size of the depiction of the objects is adapted as a function of the current length value. As a result, an optimum depiction of the objects is always ensured.

The example embodiments which are presented with regard to the device and the advantages of the embodiments apply correspondingly to the motor vehicle and to the method, and vice versa.

The features and combinations of features mentioned above in the description and the features and combinations of features mentioned below in the description of the drawings and/or shown by themselves in the drawings are useable not only in the respectively stated combination, but also in other combinations or on their own without departing from the scope of the disclosure.

Further advantages, features and details of the disclosure emerge from the claims, the description below of example embodiments and with reference to the drawings.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 3b is a sectional view of the device illustrated in FIG. 3a;

DETAILED DESCRIPTION OF THE PREFERRED EMBODIMENT

Figure 1:
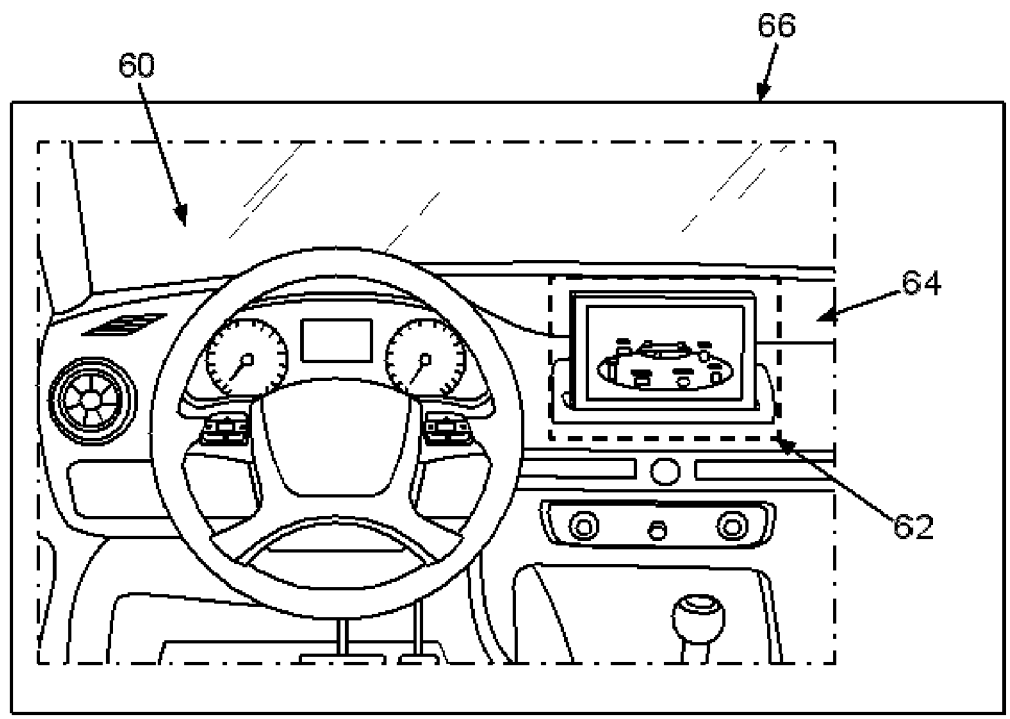
FIG. 1 is a display module which is known from the related art and is arranged on a dashboard of a vehicle.

Reference will now be made in detail to the preferred embodiments, examples of which are illustrated in the accompanying drawings, wherein like reference numerals refer to like elements throughout.

FIG. 1 shows an arrangement, which is known from the related art, of a display module 64 in a cockpit 60 of a vehicle 66. The display module 64 is fixedly installed here in a dashboard 62 and is customarily movable between a non-use position and a use position. The fixed installation indicates that a comparatively large construction space has to be kept for the display module 64.

Figure 2A:
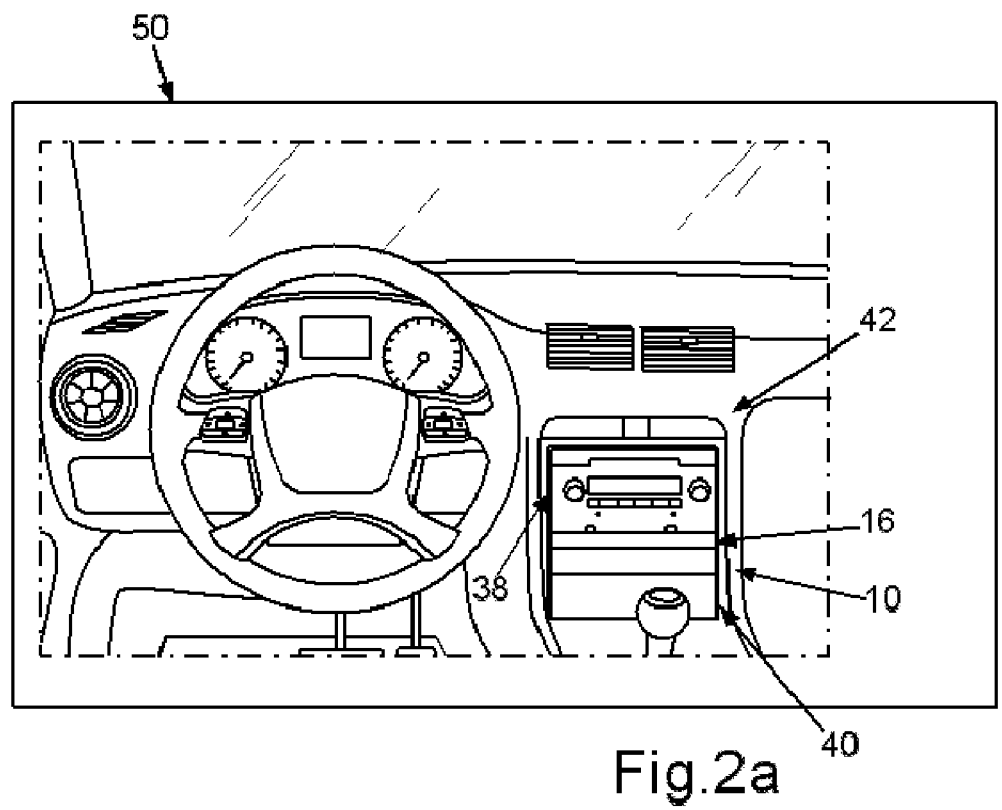
FIG. 2a is a perspective view of an embodiment of a device as an example.

FIG. 2a shows an embodiment, as an example of the disclosure, of a device 10, of which only a stowage unit 16 and respective locking device 38, 40, which are designed as guide tracks or guide rails, can be seen in FIG. 2a. The device 10 is arranged here on a holding unit 42, configured as a central console, of a motor vehicle 50.

Figure 2B:
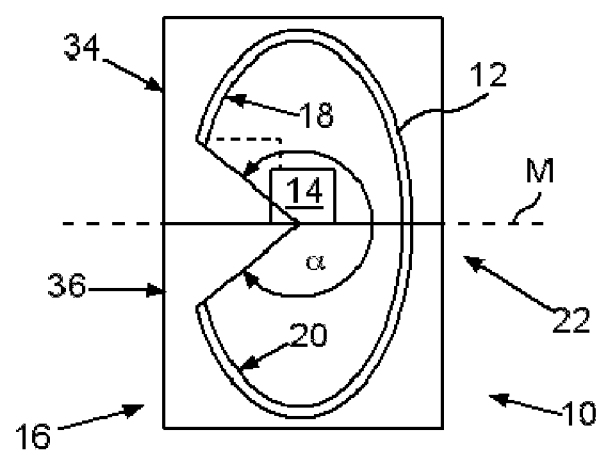
FIG. 2b is a sectional view of the device shown in FIG. 2a, wherein a display device is accommodated in a stowage position in a stowage unit of the device.
Figure 3A:
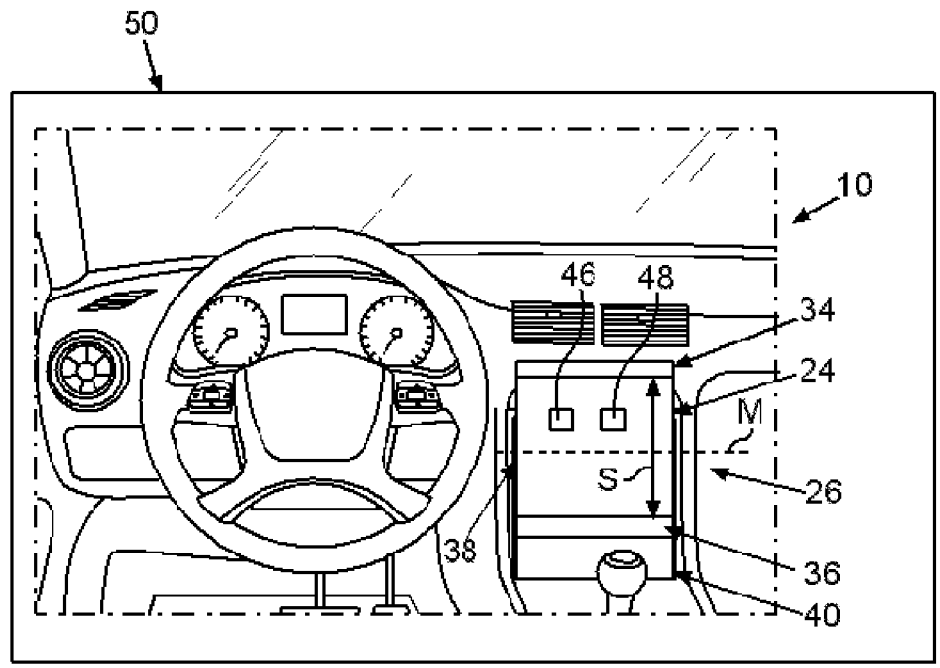
FIG. 3a is a further perspective view of the device, wherein a display device of the device is in a use position in which a useful region of the display device is visible for vehicle occupants.

FIG. 2b shows a sectional view through the stowage unit illustrated in FIG. 2a, wherein it can be seen that the device 10 may include a display device 12 and a computing device 14, which, in the exemplary embodiment, is integrated in the stowage unit 16, for controlling the display device 12. The display device 12 serves for depicting a multiplicity of objects, such as, for example, icons, graphical elements, virtual oil level indicators or other wear displays, to name just a few. In FIG. 3a, two of the objects 46, 48 are depicted merely by way of example on the display device 12.

As can furthermore be seen in FIG. 2b, a first end region 18 and a second end region 20 of the display device 12 are inserted into the stowage unit 16 in a stowage position 22 of the display device 12. In the stowage position 22 of the display device 12, the entire display device 12 is inserted in the stowage unit 16.

The stowage unit 16 here may include a first stowage element 34, in which the first end region 18 of the display device 12 is inserted at least in regions, and a second stowage element 36, in which the second end region 20 of the display device 12 opposite the first end region 18 is inserted. The first end region 18 and, additionally or alternatively, the second end region 20 are accommodated as the respective free end of the display device 12 in the respective stowage element 34, 36. As can furthermore be seen in FIG. 2b, the display device 12 is accommodated in its stowage position 22 symmetrically with respect to a center plane M in the stowage unit 16. The center plane M is shown here by dashed lines. The symmetry of the display device 12 is provided by the end regions 18, 20 having a mutually symmetrical curvature with respect to the plane of symmetry M in the stowage position 22. The computing device 14 is arranged here in a particularly space-saving manner in one of the stowage elements 34, 36 (here: in the first stowage element 34), wherein the computing device 14 is virtually completely surrounded by the display device 12 in the stowage position 22. In the exemplary embodiment shown in FIG. 2b, an enclosure angle α of, for example, a range of between 200° and up to 360° can arise here, wherein the two end regions 18, 20 touch each other at an enclosure angle of α=360°. It is clear here that the size of the enclosure angle depends firstly on the size of the display device 12 and the space available for stowing the display device 12 in the stowage unit 16 or in the individual stowage elements 34, 36. The display device 12 is designed here as a flexible OLED and, in the stowage position 22, is inserted in curved form in the stowage unit 16. Alternatively thereto, the display device 12 can also be designed as what is referred to as electronic paper (e-ink paper).

FIG. 3a shows the device 10 in a first use position 26 and therefore in a position which is different from the stowage position 22 and in which a useful region 24 of the display device 12 is extended out of the stowage unit 16 by a predeterminable use distance S. In order to extend the useful region 24 (and therefore in order to move the display device 12 into the first use position 26, in which a free view of the useful region 24 is provided for respective vehicle occupants), the two stowage units 34, 36 have been moved apart here from the stowage position 22 shown in FIG. 2b. As a result, in the exemplary embodiment, the two end regions 18, 20 have been pulled up to identical parts in each case out of the respective stowage elements 34, 36, as a result of which the useful region 24 here is symmetrical with respect to the plane of symmetry M shown in FIG. 3a. Owing to the symmetry of the useful region 24 with respect to the plane of symmetry M, possible curvatures of the useful region 24 and therefore of the display device 12 are also symmetrical with respect to the plane of symmetry M, as a result of which uniform tensioning arises in the display device 12. Owing to the uniform (symmetrically distributed) tensioning, the display device 12 can have an increased service life in particular in comparison to displays which, for example, are curved only on one side, as are known from the related art.

Figure 3B:
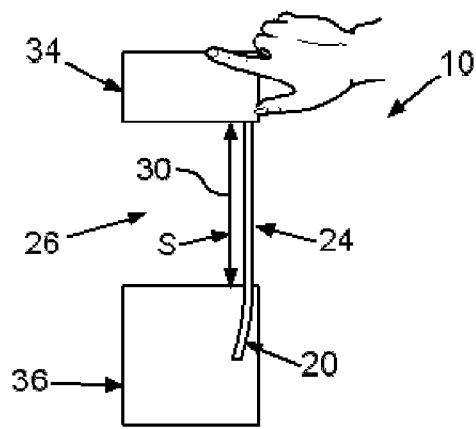
Figure 4A:
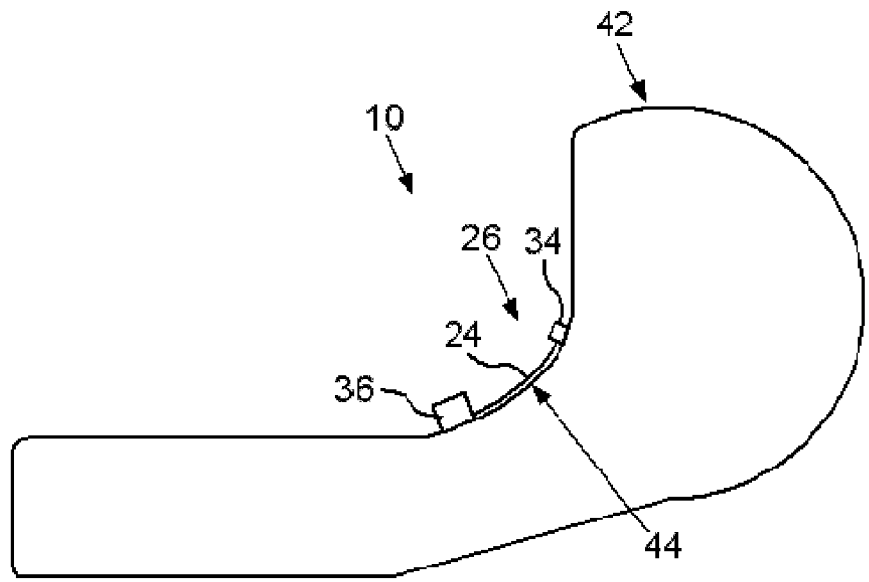
FIG. 4a is a sectional view of a holding unit of a motor vehicle, wherein the device is mounted on the holding unit so as to be movable relative thereto.
Figure 4B:
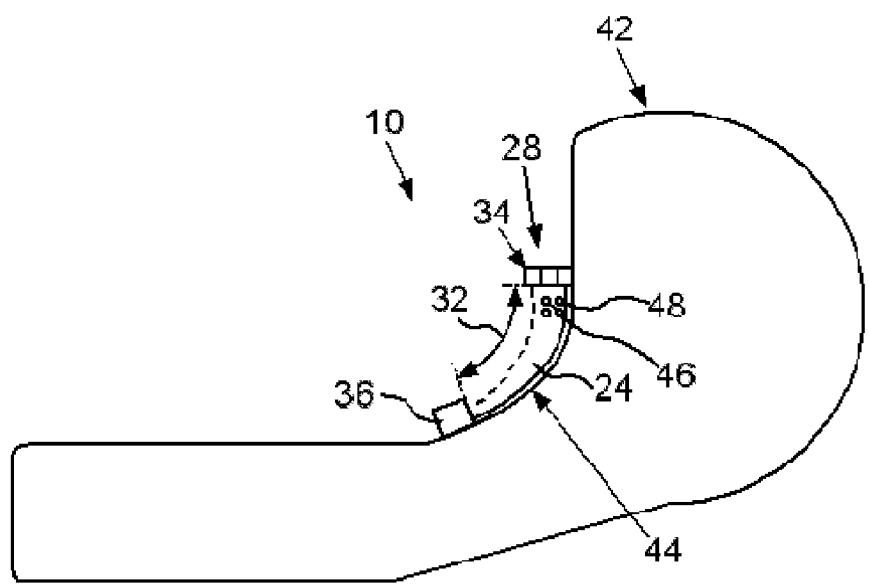
FIG. 4b is a further sectional view of the holding unit, wherein a stowage element of the stowage unit is detached in regions from the holding unit and, as a result, the display device is twisted in regions in its use position.

The display device 12, as can be seen from the overall view of FIG. 3b and FIG. 4b, is lockable at different length values 30, 32 of the use distance S, thus resulting in a plurality of different use positions 26, 28. For this purpose, the computing device 14 is designed to adjust the depiction of the objects 46, 48 as a function of the current length value 30, 32 of the use distance S. In the exemplary embodiment, with the objects 46, 48, just two objects are depicted by way of example and for clarity reasons, with it being clear, however, that the computing device 14 is also designed to adjust the depiction of a multiplicity of objects as a function of the current length value 30, 32 of the use distance S.

In FIG. 3b, the first length value 30 of the use distance S and therefore of the useful region 24 is measured along a straight line, whereas, in FIG. 4b, the second length value 32 of the use distance S there is measured in an arc.

It is clear from the overall view of FIG. 4a and FIG. 4b that the device 10 is mounted on the holding unit 42 so as to be movable relative thereto. The display device 12 can be locked by using the locking device 38, 40, which are merely shown schematically in FIG. 2a. The locking device 38, 40 can be designed here as a magnetic receptacle or as a hooking-behind device or as a touch and close fastener, wherein the stowage unit 16 and therefore the first stowage element 34 and the second stowage element 36 can be locked movably on the holding unit 42 by way of the locking device 38, 40. The first stowage element 34 of the stowage unit 16 and, additionally or alternatively, the second stowage element 36 of the stowage unit 16 are held releaseably on the holding unit 42, and the display device 12 is configured flexibly in such a manner that, as shown in FIG. 4b, the extended useful region 24 is twistable without destruction when the stowage element 34, 36 is detached. In the example shown in FIG. 4b, only the first stowage element 34 is detached at a first element end of the stowage element 34 from the holding unit 42 and therefore from the first locking device 38, whereas a second element end of the first stowage element 34 continues to be locked to the second locking device 40. This permits a pivoting at least in regions or twisting in regions of the useful region 24 in the direction of a certain vehicle occupant, as a result of which the objects 46, 48 can be viewed from a more favorable viewing angle than would be the case without the twisting/pivoting. However, it is also possible, as shown in FIG. 4a, in each of the use positions 26, 28, to orient the extended useful region 24 of the display device 12 along a contour 44 of the holding unit 42, the contour facing the display device 12, and therefore to adapt a curvature of the useful region 24 to a contour curvature of the contour 44 of the holding unit 42. As a result, the entire device 10 can be arranged in a particularly space-saving manner in the motor vehicle 50, even if one of the different use position 26, 28 is set. The computing device 14 adjusts the depiction of the objects 46, 48 as a function of the current length value 30, 32 of the use distance S. The length values 30, 32 assigned to the respective use positions 26, 28 can considerably differ from each other here. Depending on the available space provision for depicting the objects 46, 48 on the useful region 24, the computing device 14 adjusts a format of the depiction of the objects 46, 48 as a function of the length value 30, 32 of the use distance S. During the adjustment of the format of the depiction, the computing device 14 can adapt, for example, a size of the individual objects 46, 48, line breaks in the depiction of the objects, or the like.

In the exemplary embodiment, the holding unit 42 is designed as a central console of the motor vehicle 50, and the locking device 38, 40 are coupleable to the central console via guide rails (not illustrated specifically here).

In summary, the display device 12 described herein provides an extendable, flexible display which can be arranged in an interior (cockpit) of the motor vehicle 50. The flexible display (display device 12) makes it possible for a vehicle occupant to roll up or unroll the display and therefore to adjust the display between the stowage position 22 and the different use positions 26, 28 in order to set the display to a desired size depending on the user's requirements, i.e., in other words, to predetermine different length values 30, 32 of the use distance S, in which the display device 12 is lockable to the holding unit 42. In the exemplary embodiment, the holding unit 42 is formed from the central console and an instrument panel of the motor vehicle 50. The contour 44 of the holding unit 42 is of circular design here, and therefore the display (display device 12) is guidable along the contour and, in the process, in a circular arc and is adaptable to the circular arc. However, it is also conceivable to pull the display device 12 out rectilinearly and to place it down on the various use positions 26, 28, which can also be referred to as different latching points. The vehicle occupant can pull out the display device 12, for example manually, to the extent that he wishes, i.e. to the use position 26, 28 which appears most favorable to him. It is clear that there is also an end position which is assigned a maximally possible length value of the use distance S, wherein, in this end position, the useful region 24 is accordingly of maximum size. The display device 12 can be stored in a state rolled up at least in regions in the stowage position 22 in the stowage unit 16. In order to move the display device 12 from the stowage position 22 into one of the use positions 26, 28 or even into the end position, the vehicle occupant can move the first stowage element 34 and, additionally or alternatively, the second stowage element 36.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A device for a motor vehicle, comprising:
 a flexible display device configured to display objects and configured to be selectively disposed in a stowage position and in a plurality of use positions, the display device having a first end region and a second end region;
 a stowage unit in which the first end region of the display device is inserted, the display device being entirely disposed inside the stowage unit in a curved manner such that the first end region and the second end region of the display device have a mutually symmetrical curvature with respect to a center plane in the stowage unit when disposed in the stowage position, and the display device being extendable out of the stowage unit by predetermined use distances to expose a useful region of the display device when the display device is in a use position among the plurality of use positions, the display device being configured to be lockable at different length values of the predetermined use distances respectively corresponding to the plurality of use positions; and
 a computing device configured to control the display device and to adjust the display of the objects based on a current length value of a current predetermined use distance.

2. The device as claimed in claim 1, wherein the stowage unit comprises:
 a first stowage element, into which the first end region of the display device is inserted at least in regions,
 a second stowage element, in which the second end region opposite the first end region of the display device is inserted, and
 the first and second stowage elements are configured to be moved apart to extend the useful region.

3. The device as claimed in claim 2, wherein at least one of the first end region and the second end region corresponds to a respective free end of the display device and is accommodated in the respective stowage element.

4. The device as claimed in claim 1, wherein an enclosure angle of the display device is between 200° and 360° when the display device is in the stowage position.

5. The device as claimed in claim 1, wherein the display device is lockable by using at least one of a hooking-behind device, a magnetic receptacle, and a touch and close fastener.

6. The device as claimed in claim 1, wherein respective ends of the first end region of the display device and the second end region of the display device face each other when the display device is disposed in the stowage position.

7. The device as claimed in claim 1, wherein
the stowage unit includes a first stowage element and a second stowage element,
the first end region of the display device is entirely disposed inside the first stowage element in the curved manner when the display device is disposed in the stowage position,
the second end region of the display device is entirely disposed inside the second stowage element in the curved manner when the display device is disposed in the stowage position,
the first stowage element is movable with respect to the second stowage element to extend the display device out of the stowage unit.

8. The device as claimed in claim 1, wherein
the stowage unit includes a first stowage element and a second stowage element,
the first end region of the display device is entirely disposed inside the first stowage element in the curved manner when the display device is disposed in the stowage position,
the second end region of the display device is entirely disposed inside the second stowage element in the curved manner when the display device is disposed in the stowage position,
the first stowage element and the second stowage element are movable with respect to one another to extend the display device out of the stowage unit.

9. A motor vehicle, comprising:
a chassis;
a holding unit;
a device mounted on the holding unit so as to be movable relative to the holding unit, the device comprising:
　a flexible display device configured to display objects and configured to be selectively disposed in a stowage position and in a plurality of use positions, the display device having a first end region and a second end region,
　a stowage unit in which the first end region of the display device is inserted, the display device being entirely disposed inside the stowage unit in a curved manner such that the first end region and the second end region of the display device have a mutually symmetrical curvature with respect to a center plane in the stowage unit when disposed in the stowage position, and the display device being extendable out of the stowage unit by predetermined use distances to expose a useful region of the display device when the display device is in a use position among the plurality of use positions, the display device being configured to be lockable at different length values of the predetermined use distances respectively corresponding to the plurality of use positions, and
　a computing device configured to control the display device and to adjust the display of the objects based on a current length value of a current predetermined use distance.

10. The motor vehicle as claimed in claim 9, wherein, in each of the plurality of use positions, the useful region of the display device is oriented along a contour of the holding unit, the contour facing the display device.

11. The motor vehicle as claimed in claim 9, wherein the holding unit corresponds to at least one of a central console and an instrument panel of the motor vehicle.

12. The motor vehicle as claimed in claim 11, wherein
the display device includes a flexible organic light emitting diode, and
a contour of the holding unit is curved and the display device is guidable along the contour.

13. The motor vehicle as claimed in claim 9, wherein
when the display device is in a first use position among the plurality of use positions, the display device is configured to be lockable at a first length value, and
when the display device is in a second use position among the plurality of use positions, the display device is configured to be lockable at a second length value that is greater than the first length value.

14. The motor vehicle as claimed in claim 13, wherein
when the display device is in the first use position and the display device is locked at the first length value, the computing device is configured to control the display device to display a first object among the objects at a first size, and
when the display device is moved from the first use position to the second use position and the display device is locked at the second length value, the computing device is configured to control the display device to adjust the display of the first object such that the first object is displayed at a second size that is greater than the first size.

15. The motor vehicle as claimed in claim 9, wherein
the stowage unit includes a first stowage element attachable to the holding unit and a second stowage element attachable to the holding unit,
the first end region of the display device is entirely disposed inside the first stowage element in the curved manner when the display device is disposed in the stowage position,
the second end region of the display device is entirely disposed inside the second stowage element in the curved manner when the display device is disposed in the stowage position,
the first stowage element and the second stowage element are configured to move apart from one another via movement along the holding unit to extend the display device out of the stowage unit such that the useful region is symmetric with respect to the center plane.

16. A motor vehicle, comprising:
a chassis;
a holding unit;
a device mounted on the holding unit so as to be movable relative to the holding unit, the device comprising:
　a display device configured to display objects and configured to be selectively disposed in a stowage position and in a plurality of use positions,
　a stowage unit in which a first end region of the display device is inserted, the display device being entirely disposed inside the stowage unit when disposed in the stowage position, and being extendable out of the stowage unit by predetermined use distances to expose a useful region of the display device when the display device is in a use position among the plurality of use positions, the display device being configured to be lockable at different length values of the predetermined use distances respectively corresponding to the plurality of use positions, and a computing device configured to control the display device and to adjust the display of the objects based on a current length value of a current predetermined use distance wherein the stowage unit includes:
- a first stowage element, into which the first end region of the display device is inserted at least in regions, and
- a second stowage element, in which a second end region opposite the first end region of the display device is inserted, the first and second stowage elements are configured to be moved apart to extend the useful region, at least one of the first stowage element of the stowage unit and the second stowage element of the stowage unit is held releaseably on the holding unit, and the display device is configured flexibly so that the useful region extendable out of the stowage unit is twistable when the at least one of the first stowage element and the second stowage element of the stowage unit is detached.

17. A method for operating a device having a flexible display device configured to be selectively disposed in a stowage position and in a plurality of use positions, the display device having a first end region and a second end region, the method comprising:

displaying objects by the display device;

providing a stowage unit in which the first end region of the display device is inserted, the display device being entirely disposed inside the stowage unit in a curved manner such that the first end region and the second end region of the display device have a mutually symmetrical curvature with respect to a center plane in the stowage unit when disposed in the stowage position, and being extendable out of the stowage unit by predetermined use distances to expose a useful region of the display device when the display device is in a use position among the plurality of use positions, the display device being configured to be lockable at different length values of the predetermined use distances respectively corresponding to the plurality of use positions; and controlling, by a computing device, the display of the objects based on a current length value of a current predetermined use distance.

18. The method as claimed in claim 17, further comprising adjusting, by the computing device, a format of the display based on the current length value.

19. The method as claimed in claim 17, further comprising:

extending the display device out of the stowage unit to a first use position among the plurality of use positions, and locking the display device at a first length value; and controlling the display device to display a first object among the objects at a first size.

20. The method as claimed in claim 19, further comprising:

extending the display device from the first use position to a second use position among the plurality of use positions, and locking the display device at a second length value that is greater than the first length value; and controlling the display device to adjust the display of the first object such that the first object is displayed at a second size that is greater than the first size.

* * * * *